United States Patent
Nishimoto et al.

(10) Patent No.: US 11,412,316 B2
(45) Date of Patent: Aug. 9, 2022

(54) OPTICAL LINE TERMINAL AND BANDWIDTH ALLOCATION METHOD

(71) Applicant: NIPPON TELEGRAPH AND TELEPHONE CORPORATION, Tokyo (JP)

(72) Inventors: Keita Nishimoto, Tokyo (JP); Takashi Mitsui, Tokyo (JP); Tomoya Hatano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/734,192

(22) PCT Filed: Jun. 6, 2019

(86) PCT No.: PCT/JP2019/022522
§ 371 (c)(1),
(2) Date: Dec. 1, 2020

(87) PCT Pub. No.: WO2019/235564
PCT Pub. Date: Dec. 12, 2019

(65) Prior Publication Data
US 2021/0168475 A1 Jun. 3, 2021

(30) Foreign Application Priority Data
Jun. 6, 2018 (JP) .............................. JP2018-108981

(51) Int. Cl.
*H04B 10/27* (2013.01)
*H04Q 11/00* (2006.01)
(Continued)

(52) U.S. Cl.
CPC ....... *H04Q 11/0067* (2013.01); *H04B 10/272* (2013.01); *H04L 12/44* (2013.01);
(Continued)

(58) Field of Classification Search
CPC .............. H04Q 11/0067; H04B 10/272; H04L 43/0888; H04L 12/44; H04L 47/821
See application file for complete search history.

(56) References Cited

U.S. PATENT DOCUMENTS

2009/0304385 A1 12/2009 Khermosh
2012/0294611 A1* 11/2012 Adler ................. H04Q 11/0067
398/45
(Continued)

FOREIGN PATENT DOCUMENTS

CN 101436916 A 5/2009
JP 2016149609 A 8/2016

OTHER PUBLICATIONS

M. McGarry et al., "Ethernet Passive Optical Network Architectures and Dynamic Bandwidth Allocation Algorithms," IEEE Communications Surveys & Tutorials, vol. 10(3), pp. 46-60, 2008.
(Continued)

*Primary Examiner* — Dzung D Tran
(74) *Attorney, Agent, or Firm* — Harness, Dickey & Pierce, P.L.C.

(57) ABSTRACT

An optical line terminal is provided with: an absorption unit that acquires first information of a type and a format that are dependent on a communication scheme and that converts the acquired first information into second information of a type and a format that are common to mutually different communication schemes; and a bandwidth allocation unit that determines bandwidth allocation of an upstream signal allocated to an optical network unit on the basis of the second information.

5 Claims, 10 Drawing Sheets

(51) Int. Cl.
     *H04B 10/272*    (2013.01)
     *H04L 12/44*     (2006.01)
     *H04L 43/0888*   (2022.01)
     *H04L 43/0894*   (2022.01)
     *H04L 47/70*     (2022.01)

(52) U.S. Cl.
     CPC ...... *H04L 43/0888* (2013.01); *H04L 43/0894* (2013.01); *H04L 47/821* (2013.01)

(56) References Cited

U.S. PATENT DOCUMENTS

2012/0308228 A1* 12/2012 Tanaka ............... H04Q 11/0067
                                                        398/25
2014/0321854 A1   10/2014 Ghazisaidi
2016/0105376 A1*   4/2016 Cvijetic ............... H04L 47/821
                                                       709/224
2018/0332373 A1* 11/2018 Wey ................... H04Q 11/0062

OTHER PUBLICATIONS

G. Kramer et al., "IPACT: A Dynamic Protocol for an Ethernet PON (EPON)," IEEE Commun. Mag., vol. 40(2), pp. 74-80, 2002.
S. Choi et al., "Double-Phase Polling Algorithm Based on Partitioned ONU Subgroups for High Utilization in EPONs," Journal of Opt. Commun. and Networking, vol. 1(5), pp. 484-497, 2009.
International Search Report issued in PCT/JP2019/022522, dated Aug. 27, 2019.

\* cited by examiner

| ONU-ID | LLID | TRANSMISSION RATE | RTT | ... | ONU MAC |
|---|---|---|---|---|---|
| 1 | 1 | 1Gbps | 100μs | ... | 11:11:11:11:11:11 |
| 2 | 2 | 10Gbps | 200μs | ... | 22:22:22:22:22:22 |
| ... | ... | ... | ... | ... | ... |

| ONU-ID | Alloc-ID | ... | Serial Number |
|---|---|---|---|
| 1 | 1 | ... | ... |
| 2 | 2 | ... | ... |
| ... | ... | ... | ... |

| ONU-ID | ALLOCATION CONSTRAINT CONDITIONS | LLID | QUEUE ID | DEMANDED BANDWIDTH AMOUNT |
|---|---|---|---|---|
| | REQUESTED BANDWIDTH NUMBER : N-1 | | | |
| | REQUESTED BANDWIDTH NUMBER : N | | | |
| 1 | 0<TRANSMISSION STARTING TIME | 1 | 1 | 10 μs |
| 1 | 0<TRANSMISSION STARTING TIME | 2 | 1 | 20 μs |
| 2 | 20<TRANSMISSION STARTING TIME | 3 | 1 | 5 μs |

OPTICAL LINE TERMINAL AND BANDWIDTH ALLOCATION METHOD

CROSS-REFERENCE TO RELATED APPLICATIONS

This application is a 371 National Stage of International Application No. PCT/JP2019/022522 filed on Jun. 6, 2019, which claims priority to Japanese Patent Application No. 2018-108981, filed Jun. 6, 2018. The entire disclosures of the above applications are incorporated herein by reference.

TECHNICAL FIELD

The present invention relates to an optical line terminal and a bandwidth allocation method.

Priority is claimed on Japanese Patent Application No. 2018-108981, filed Jun. 6, 2018, the content of which is incorporated herein by reference.

BACKGROUND ART

In recent years, the idea of providing the functions for dynamic bandwidth allocation (DBA) (hereinafter referred to as "DBA") performed by an optical line terminal (OLT) in a passive optical network (PON) (hereinafter referred to as "PON") in the form of software (componentization) has been considered. By separating a DBA functional unit from the other functional units in an optical line terminal, the DBA functional unit can be commonly used regardless of the communication scheme and/or the vendor. Additionally, reductions in the cost of optical line terminals can be expected.

As examples of DBA in PONs, DBA in Ethernet (registered trademark) PONs (EPONs) and DBA in Giga-bit PONs (GPONs) will be described. Hereinafter, the direction from an optical network unit (ONU) towards an optical line terminal will be referred to as the "upstream direction". Hereinafter, the direction from an optical line terminal towards an optical network unit will be referred to as the "downstream direction".

In EPONs and GPONs, multiple optical network units are connected to an optical line terminal via an optical fiber and an optical splitter shared by these optical network units. The optical line terminal controls the transmission of burst signals in the upstream direction in order to prevent collisions between the burst signals in the upstream direction. The DBA functional unit in an optical line terminal allocates bandwidth to the signals in the upstream direction by means of DBA.

In an EPON, an optical line terminal allocates bandwidth to signals in the upstream direction by means of multi-point control protocol (MPCP). An optical network unit uses a REPORT message to demand, from the optical line terminal, permission to transmit signals in the upstream direction (to allocate bandwidth). The optical line terminal uses a GATE message to notify an optical network unit that the transmission of signals in the upstream direction is permitted (see Non-Patent Document 1).

There is a scheme called "online allocation" in which, when an optical line terminal receives a REPORT message from at least one optical network unit among multiple optical network units connected to a PON, the optical line terminal transmits a GRANT message to the optical network unit (see Non-Patent Document 2). Additionally, there is a scheme called "double-phase DBA" in which an optical line terminal performs DBA separately for groups defined among the optical network units (see Non-Patent Document 3).

It should be noted that an optical line terminal allocates bandwidth to the optical network units separately for logical link IDs (LLIDs) allocated to the optical network units. Multiple LLIDs may be allocated to a single optical network unit.

A REPORT message includes the LLID of the optical network unit that demanded bandwidth allocation, and information representing the demanded bandwidth amount (hereinafter referred to as "demanded bandwidth amount information"). A GATE message includes the LLID of the optical network unit being notified that signal transmission has been permitted, transmission starting time information, and transmission bandwidth amount information.

The optical line terminal determines the transmission starting time information and the transmission bandwidth amount information on the basis of the demanded bandwidth amount information. The optical network unit having the LLID included in the GATE message transmits signals in the upstream direction on the basis of the transmission starting time information and the transmission bandwidth amount information.

In a GPON, an optical line terminal allocates bandwidth to signals in the upstream direction on the basis of an upstream bandwidth map (USBWMap) included in the header of a G-PON transmission convergence (GTC) frame in the downstream direction. The USBWMap includes transmission starting time information, transmission ending time information, and Alloc-IDs for all of the optical network units connected to the PON. In the USBWMap, transmission staring time information and transmission ending time information is indicated for each Alloc-ID.

Each optical network unit is allocated an Alloc-ID. Multiple Alloc-IDs may be allocated to a single optical network unit. Additionally, the optical line terminal broadcasts GTC frames to all optical network units with a period of 125 μs. A dynamic bandwidth report (DBRu) in a GTC frame in the upstream direction transmitted from each optical network unit to the optical line terminal includes demanded bandwidth amount information.

Hereinafter, messages for demanding permission to transmit signals in a PON (REPORT messages in an EPON and DBRu in a GPON) will be referred to collectively as "REPORT messages". Hereinafter, messages permitting the transmission of signals in a PON will be referred to as "GRANT messages".

PRIOR ART DOCUMENTS

Non-Patent Documents

Non-Patent Document 1: M. McGarry et al., "ETHERNET PASSIVE OPTICAL NETWORK ARCHITECTURES AND DYNAMIC BANDWIDTH ALLOCATION ALGORITHMS", IEEE Communications Surveys & Tutorials, Vol. 10(3), pp. 46-60, 2008.

Non-Patent Document 2: G. Kramer et al., "IPACT: A Dynamic Protocol for an Ethernet PON (EPON)", IEEE Commun. Mag., Vol. 40(2), pp. 74-80, 2002.

Non-Patent Document 3: S. Choi et al., "Double-Phase Polling Algorithm Based on Partitioned ONU Subgroups for High Utilization in EPONs", Journal of Opt. Commun. And Networking, Vol. 1(5), pp. 484-497, 2009.

SUMMARY OF INVENTION

Problems to be Solved by the Invention

However, the frames of the GRANT messages in EPONs and the frames of the GRANT messages in GPONs are in different formats. The frames of the REPORT messages in EPONs and the frames of the REPORT messages in GPONs are in different formats.

Similarly, the information included in the GRANT messages in EPONs and the information included in the GRANT messages in GPONs are of different types and have different set values and the like. The information included in the REPORT messages in EPONs and the information included in the REPORT messages in GPONs are of different types and have different set values and the like.

In this way, EPONs and GPONs are different in terms of the types and formats of information exchanged between the DBA functional units and other functional units in the optical line terminals in the PONs. The interfaces between the DBA functional units and other functional units in the optical line terminals will become increasingly complex as the communication schemes of the PONs or the hardware structures of the optical line terminals become diversified. For this reason, even if attempts are made to commonize the DBA functional units in the optical line terminals in EPONs and GPONs, the types of interfaces needed for exchanging information between the DBA functional units and other functional units in the optical line terminals will increase, thereby complexifying the interfaces.

In this way, conventional optical line terminals have the problem that the interfaces between the DBA functional units and other functional units will be complexified if the communication schemes of the PONs or the hardware structures of the optical line terminals become diversified.

In consideration of the above-described circumstances, an object of the present invention is to provide an optical line terminal and a bandwidth allocation method that can suppress the complexification of the interfaces between DBA functional units and other functional units in optical line terminals when communication schemes of PONs or the hardware structures of the optical line terminals become diversified.

Means for Solving the Problems

An aspect of the present invention is an optical line terminal including: an absorption unit that acquires first information of a type and a format that are dependent on a communication scheme and that converts the acquired first information into second information of a type and a format that are common to mutually different communication schemes; and a bandwidth allocation unit that determines bandwidth allocation of an upstream signal allocated to an optical network unit on the basis of the second information.

The above-mentioned optical line terminal may further include a mediation unit that outputs the second information to the bandwidth allocation unit and that outputs information representing the bandwidth allocation of the upstream signal allocated to the optical network unit to the absorption unit.

In the above-mentioned optical line terminal, the first information may be information in accordance with a message by which the optical network unit demands permission to transmit the upstream signal.

In the above-mentioned optical line terminal, the absorption unit may allocate bandwidth to the upstream signal on the basis of a bandwidth amount determined by the bandwidth allocation unit.

In the above-mentioned optical line terminal, the bandwidth allocation unit may allocate bandwidth to the upstream signal by using an allocation algorithm that differs for each bandwidth.

An aspect of the present invention is a bandwidth allocation method performed by an optical line terminal, and the bandwidth allocation method includes: a step of acquiring first information of a type and a format that are dependent on a communication scheme and converting the acquired first information into second information of a type and a format that are common to mutually different communication schemes; and a step of determining bandwidth allocation of an upstream signal allocated to an optical network unit on the basis of the second information.

Advantageous Effects of the Invention

The present invention is able to suppress the complexification of the interfaces between DBA functional units and other functional units in optical line terminals when communication schemes of PONs or the hardware structures of the optical line terminals become diversified.

MODES FOR CARRYING OUT THE INVENTION

Embodiments of the present invention will be described in detail with reference to the drawings.

First Embodiment

In the first embodiment, the cases in which an optical line terminal performs offline bandwidth allocation in an EPON and a GPON, which are examples of PONs, will be described.

In offline bandwidth allocation, when an optical line terminal has received REPORT messages from all of the optical network units in a PON, the optical line terminal performs DBA. The optical line terminal transmits GRANT messages to all of the optical network units connected to the PON on the basis of the results of the DBA.

Figure 1:
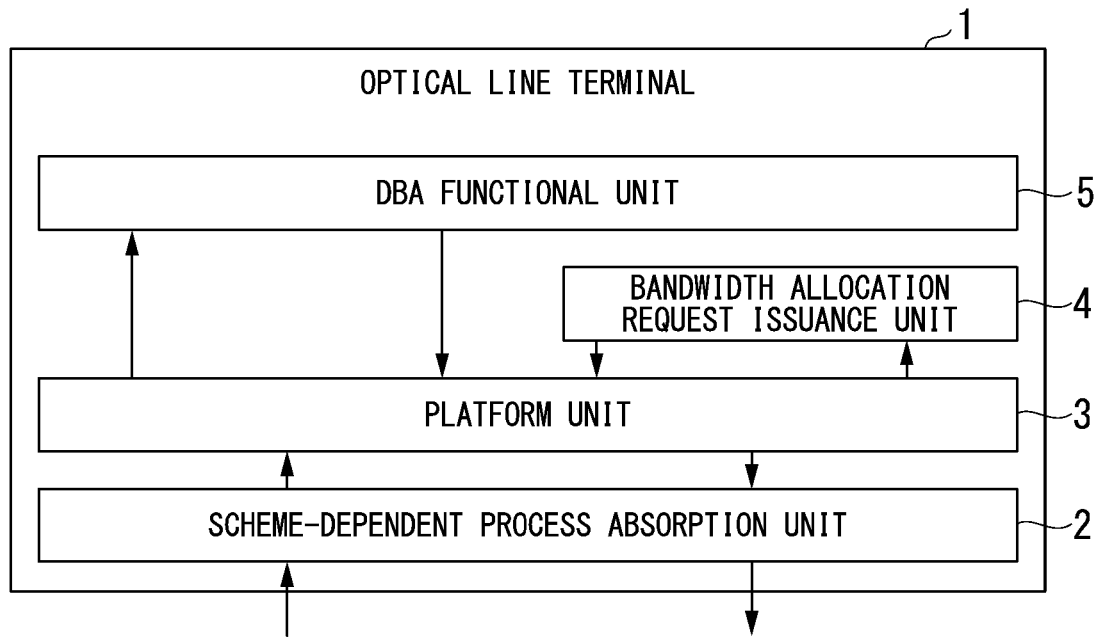
FIG. 1 is a diagram illustrating an example of the structure of an optical line terminal.

FIG. 1 is a diagram showing an example of the structure of an optical line terminal 1. The optical line terminal 1 is provided with a scheme-dependent process absorption unit 2, a platform unit 3, a bandwidth allocation request issuance unit 4, and a DBA functional unit 5. The optical line terminal 1 is provided with a scheme-dependent process absorption unit 2 for each communication scheme of a PON or each hardware structure of the optical line terminal 1. For example, the optical line terminal 1 is provided with a scheme-dependent process absorption unit 2 for an EPON and a scheme-dependent process absorption unit 2 for a GPON.

Some or all of the functional units are implemented by executing a program. Some or all of the functional units may be implemented by means of hardware such as an large-scale integration (LSI) or an application-specific integrated circuit (ASIC). The optical line terminal 1 may further include a non-volatile storage unit (non-transitory recording medium) such as a flash memory. This storage unit stores, for example, programs executed by the respective functional units.

The scheme-dependent process absorption unit 2 is a functional unit that absorbs the differences between EPONs and GPONs regarding the processes that are dependent on the communication scheme of a PON or the hardware structure of the optical line terminal 1. There are no differences in the basic processes and structures between a scheme-dependent process absorption unit 2 for an EPON and a scheme-dependent process absorption unit 2 for a GPON. The scheme-dependent process absorption unit 2 can provide, at the platform unit 3, an interface that is common to EPONs and GPONs. Thus, there is no need for the optical line terminal 1 to be provided with a new interface for each communication scheme of PONs or each hardware structure of the optical terminal line 1.

The platform unit 3 is a functional unit that mediates information between the scheme-dependent process absorption unit 2 and the DBA functional unit 5. The platform unit 3 synchronizes the processes executed by the scheme-dependent process absorption unit 2 with the processes executed by the DBA functional unit 5.

The bandwidth allocation request issuance unit 4 is a functional unit that requests the DBA functional unit 5 to allocate bandwidth. The bandwidth allocation request issuance unit 4 designates, to the DBA functional unit 5, the requested bandwidth to be allocated. The bandwidth allocation request issuance unit 4 requests the DBA functional unit 5 to allocate bandwidth via the platform unit 3.

The DBA functional unit 5 is a functional unit that performs DBA on the basis of units (e.g., time units) that are common to different communication schemes. The DBA functional unit 5 computes the bandwidth to be allocated to signals such as user data without depending on the communication scheme.

Next, the structures of the functional units in the optical line terminal 1 will be described.

Figure 2:
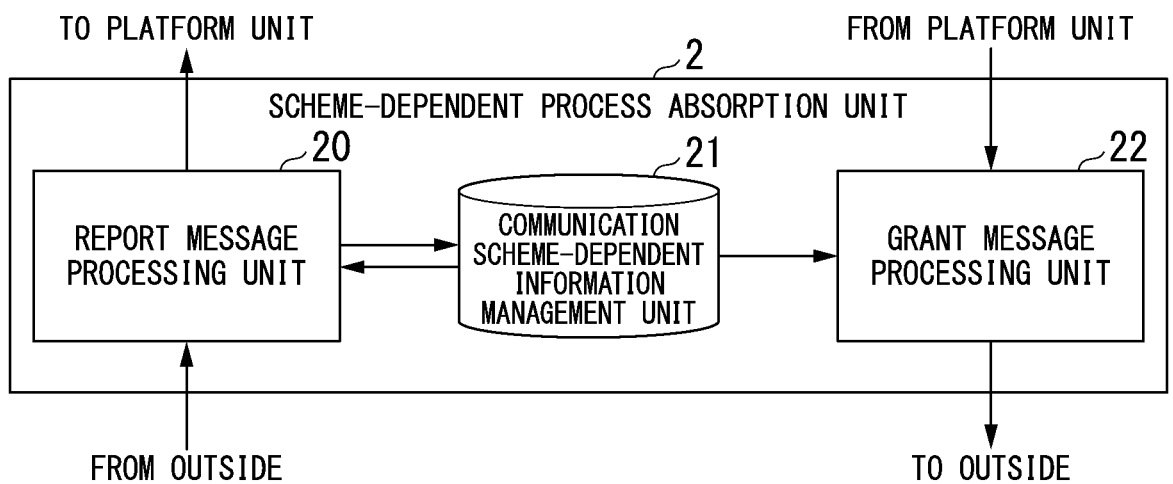
FIG. 2 is a diagram illustrating an example of the structure of a scheme-dependent process absorption unit.

FIG. 2 is a diagram illustrating an example of the structure of the scheme-dependent process absorption unit 2. The scheme-dependent process absorption unit 2 is provided with a REPORT message processing unit 20, a communication scheme-dependent information management unit 21, and a GRANT message processing unit 22.

Figure 3:
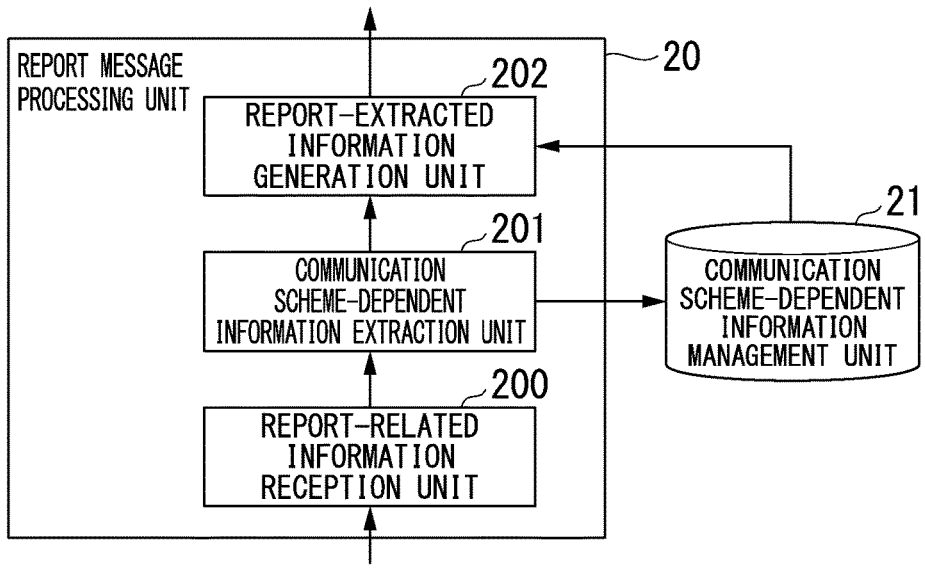
FIG. 3 is a diagram illustrating an example of a REPORT message processing unit.

FIG. 3 is a diagram illustrating an example of the structure of the REPORT message processing unit 20. The REPORT message processing unit 20 is provided with a REPORT-related information reception unit 200, a communication scheme-dependent information extraction unit 201, and a REPORT-extracted information generation unit 202.

The REPORT-related information reception unit 200 acquires REPORT-related information, which is information regarding a REPORT message, from a functional unit provided in the optical line terminal 1 other than the REPORT-related information reception unit 200. The REPORT-related information reception unit 200 may acquire the REPORT-related information from an apparatus other than the optical line terminal 1. The REPORT-related information reception unit 200 may acquire the REPORT-related information from an external system.

The REPORT-related information reception unit 200 acquires the REPORT-related information that holds information of a type and format dependent on the communication scheme, such as EPON and GPON. The REPORT-related information is, for example, a REPORT message itself that has been transmitted from an optical network unit to the optical line terminal 1. The REPORT-related information may, for example, be a REPORT message that has been preprocessed by an external system.

The REPORT-related information includes information representing a demanded bandwidth amount (e.g., a buffer length) for each bandwidth allocation unit. In an EPON, the bandwidth allocation unit is an LLID. In a GPON, the bandwidth allocation unit is an Alloc-ID. There may also be multiple queues identified by queue IDs. The REPORT-related information reception unit 200 outputs the acquired REPORT-related information to the communication scheme-dependent information extraction unit 201.

The communication scheme-dependent information extraction unit 201 acquires REPORT-related information from the REPORT-related information reception unit 200. The communication scheme-dependent information extraction unit 201 extracts information that depends on the communication scheme (hereinafter referred to as "communication scheme-dependent information") from the REPORT-related information. The communication scheme-dependent information extraction unit 201 records the extracted communication scheme-dependent information in the communication scheme-dependent information management unit 21, which is a recording device.

The communication scheme-dependent information is, for example, information representing the round trip time (RTT) necessary for DBA processing in an EPON. For example, if the REPORT-related information is a REPORT message itself, then the REPORT message includes information representing the time at which the optical network unit transmitted the REPORT message (transmission time). The optical line terminal 1 can measure the RTT between the optical line terminal 1 and the optical network unit on the basis of the result obtained by subtracting the transmission time from the time at which the REPORT-related information reception unit 200 acquired the REPORT message.

It should be noted that the REPORT-related information reception unit 200 may acquire information representing the RTT from an external system that has measured the RTT. The communication scheme-dependent information extraction unit 201 may extract the RTT from the acquired information. If the PON accommodates optical network units having mutually different signal transmission rates (e.g., 1 gigabits per second (Gbps) optical network units and 10-Gbps optical network units), then the communication scheme-dependent information may include transmission rate information or the like for each optical network unit.

The REPORT-extracted information generation unit 202 acquires the REPORT-related information from the communication scheme-dependent information extraction unit 201. The REPORT-extracted information generation unit 202 may convert communication scheme-dependent information acquired from the communication scheme-dependent information management unit 21 into predetermined information. Predetermined information is, for example, information representing the result obtained by converting the bandwidth allocation demand information (buffer length) included in the REPORT-related information into time on the basis of the transmission rate information. The REPORT-extracted information generation unit 202 may output information representing the converted result to the platform unit 3 as REPORT-extracted information.

The REPORT-extracted information generation unit 202 generates REPORT-extracted information by removing communication scheme-dependent information from the REPORT-related information. The format of the REPORT-extracted information is a format that does not depend on the communication scheme, and is a format that is common to mutually different communication schemes.

Figure 4:
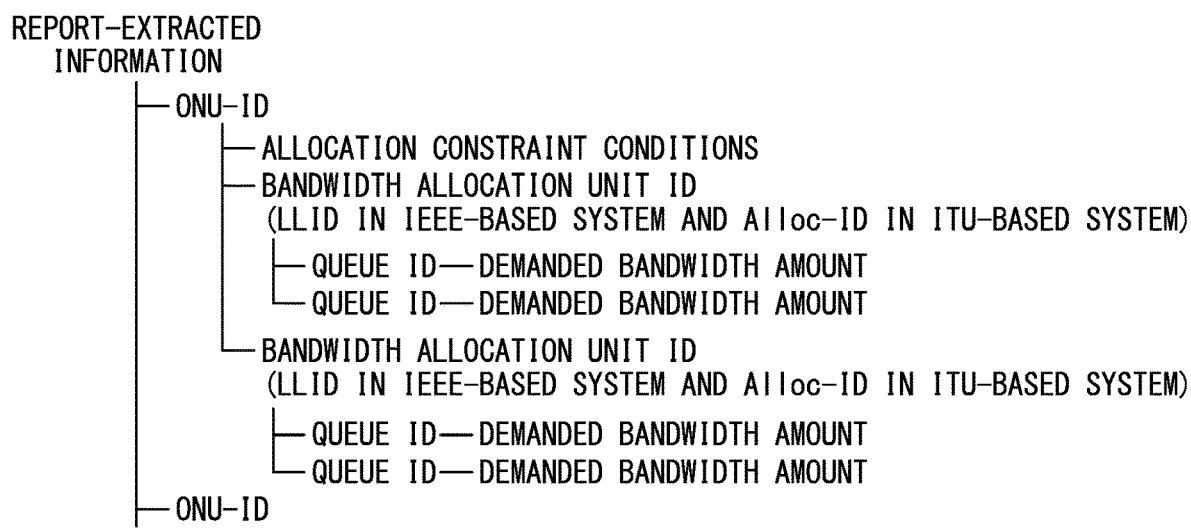
FIG. 4 is a diagram illustrating an example of a format for REPORT-extracted information.

FIG. 4 is a diagram illustrating an example of the format of the REPORT-extracted information. The REPORT-extracted information generation unit 202 generates the REPORT-extracted information for each of identifiers of optical network units (ONU-IDs). Multiple bandwidth allocation units may be allocated to a single optical network unit. In an Institute of Electrical and Electronics Engineers (IEEE)-based PON such as an EPON, the bandwidth allocation unit is an LLID. In an International Telecommunication Union (ITU)-based PON such as a GPON, the bandwidth allocation unit is an Alloc-ID.

Multiple queues may be allocated to a single bandwidth allocation unit. The queues are identified by queue IDs. The queues store information representing demanded bandwidth amounts extracted from the REPORT-related information. The units of the demanded bandwidth amounts are units that are common to mutually different communication schemes, and are for example, time units.

The REPORT-extracted information may include information representing allocation constraint conditions for each optical network unit. The allocation constraint conditions are represented by conditional expressions such as inequalities. Additionally, the allocation constraint conditions may be represented by multiple conditional expressions. The allocation units in the allocation constraint conditions are units that are common to mutually different communication schemes.

The allocation constraint conditions in an EPON are determined in accordance with propagation delays or the like of the signals to the respective optical network units. For example, if the RTT between the optical line terminal 1 and a first optical network unit is RTT1, then the signals in the upstream direction from the first optical network unit can be allocated to bandwidth at a time after a time period equal to or longer than RTT1 has elapsed from the current time. For example, if the RTT between the optical line terminal 1 and a second optical network unit is RTT2, then the signals in the upstream direction from the second optical network unit can be allocated to bandwidth at a time after a time period equal to or longer than RTT2 has elapsed from the current time.

The allocation constraint conditions may take into account the time period required for transmitting the signals and a guard time. The REPORT-extracted information may include items (e.g., information representing guard times) other than bandwidth allocation units and demanded bandwidth amounts as long as the items are those that can be converted into units that are common to the mutually different communication schemes among items that similarly exists in mutually different communication schemes.

The REPORT-extracted information generation unit 202 outputs the REPORT-extracted information including the information representing allocation constraint conditions to the platform unit 3. The REPORT-extracted information generation unit 202 outputs the REPORT-extracted information to the platform unit 3 each time the REPORT-extracted information reception unit 200 acquires REPORT-related information and communication scheme-dependent information is recorded in the communication scheme-dependent information management unit 21. The REPORT-extracted information generation unit 202 may collect multiple sets of REPORT-extracted information until the total amount of data of the generated REPORT-extracted information reaches a predetermined data amount. The REPORT-extracted information generation unit 202 may output the multiple sets of REPORT-extracted information that have been collected to the platform unit 3.

The communication scheme-dependent information management unit 21 stores the communication scheme-dependent information extracted from the REPORT message.

Figures 5, 6, 7:
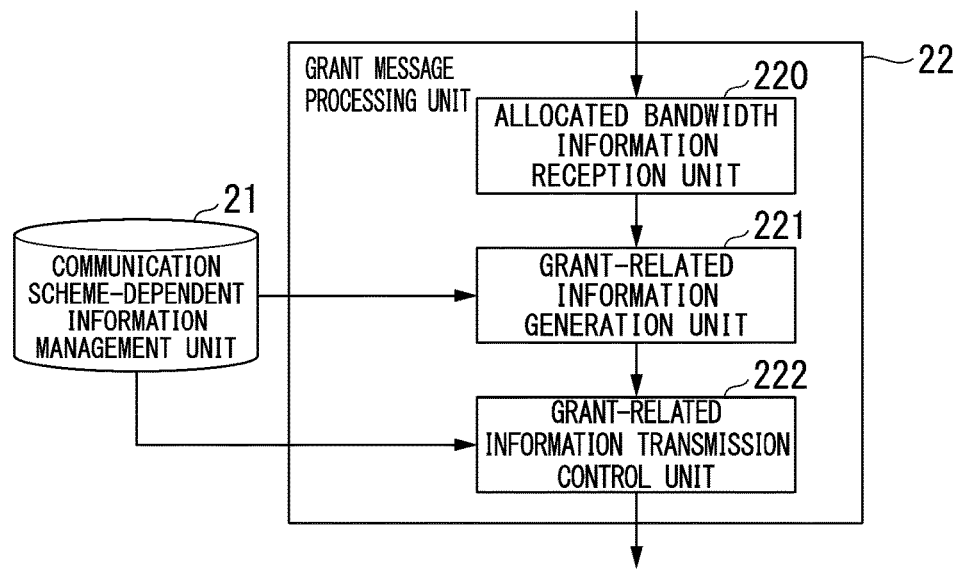
FIG. 5 is a diagram illustrating an example of communication scheme-dependent information in an EPON.
FIG. 6 is a diagram illustrating an example of communication scheme-dependent information in a GPON.
FIG. 7 is a diagram illustrating an example of the structure of a GRANT message processing unit.

FIG. 5 is a diagram illustrating an example of communication scheme-dependent information in an EPON. In communication scheme-dependent information in an EPON, ONU-IDs, identifiers (LLIDs) of optical network units, information representing the transmission rates of the optical network units, and the RTTs of the optical network units are linked. In an EPON, identifiers of optical network unit (ONU-IDs) are not defined. Thus, for example, the media access control addresses (MAC addresses) of optical network units may be linked to the identifiers (LLIDs) of the optical network units.

FIG. 6 is a diagram illustrating an example of communication scheme-dependent information in a GPON. In communication scheme-dependent information in a GPON, identifiers of optical network units (ONU-IDs) and Alloc-IDs are linked. In the communication scheme-dependent information in a GPON, the serial numbers of optical network units may be further linked.

FIG. 7 is a diagram illustrating an example of the structure of the GRANT message processing unit 22. The GRANT message processing unit 22 is provided with an allocated bandwidth information reception unit 220, a GRANT-related information generation unit 221, and a GRANT-related information transmission control unit 222. Hereinafter, sets of information representing burst bandwidth that has been allocated are referred to as "allocated bandwidth information".

The GRANT message processing unit 22 acquires allocated bandwidth information from the platform unit 3. The GRANT message processing unit 22 generates GRANT-related information on the basis of the allocated bandwidth information. The GRANT-related information is a set including, as elements thereof, GRANT messages transmitted from the optical line terminal 1. The GRANT-related information may be a set including, as elements thereof, information allowing GRANT messages to be generated.

The allocated bandwidth information reception unit 220 acquires the allocated bandwidth information from the platform unit 3. The allocated bandwidth information reception unit 220 outputs, to the GRANT-related information generation unit 221, differential information between previously acquired allocated bandwidth information and the currently acquired allocated bandwidth information. Hereinafter, the temporally arranging (scheduling) the bandwidth of the signals will be referred to as "bandwidth allocation". Hereinafter, the execution period of bandwidth allocation will be referred to as the "DBA period".

In offline bandwidth allocation in an EPON, the allocated bandwidth information that the allocated bandwidth information reception unit 220 acquires at once from the platform unit 3 is information representing the bandwidth amount allocated during the DBA period. In offline bandwidth allocation in a GPON, the allocated bandwidth information that the allocated bandwidth information reception unit 220 acquires at once from the platform unit 3 is information representing the bandwidth amount allocated during a time period that is a natural-number multiple of 125 μs. Thus, the allocated bandwidth information reception unit 220 divides the burst bandwidth represented by the burst bandwidth information included in the allocated bandwidth information into time slots (125 μs) in accordance with the reception times of the allocated bandwidth information. The allocated bandwidth information reception unit 220 outputs allocated bandwidth information, which includes burst bandwidth information representing the divided burst bandwidth, to the GRANT-related information generation unit 221.

The GRANT-related information generation unit 221 generates GRANT-related information that is to be transmitted to optical network units on the basis of the acquired allocated bandwidth information and communication scheme-dependent information acquired from the communication scheme-dependent information management unit 21. The GRANT-related information is a set including, as elements thereof, GRANT messages transmitted from the optical line terminal 1 to the optical network units. The GRANT-related information may be a set including, as elements thereof, information allowing GRANT messages to be generated.

It should be noted that the format of the GRANT-related information differs depending on the communication scheme of a PON that the scheme-dependent process absorption unit 2 handles or the hardware structure of the optical line terminal 1. In an EPON, the GRANT-related information generation unit 221 generates GRANT-related information that is to be transmitted to an optical network unit on the basis of the a bandwidth allocation unit (e.g., an LLID in an EPON) included in each burst bandwidth information, a transmission starting time at which the optical network unit is to start transmitting an upstream burst signal, and a transmission time period during which the optical network unit is to transmit the upstream burst signal. The transmission starting time and the transmission time period, which are GRANT-related information, are in units of time quantum (TQ).

Figure 8:
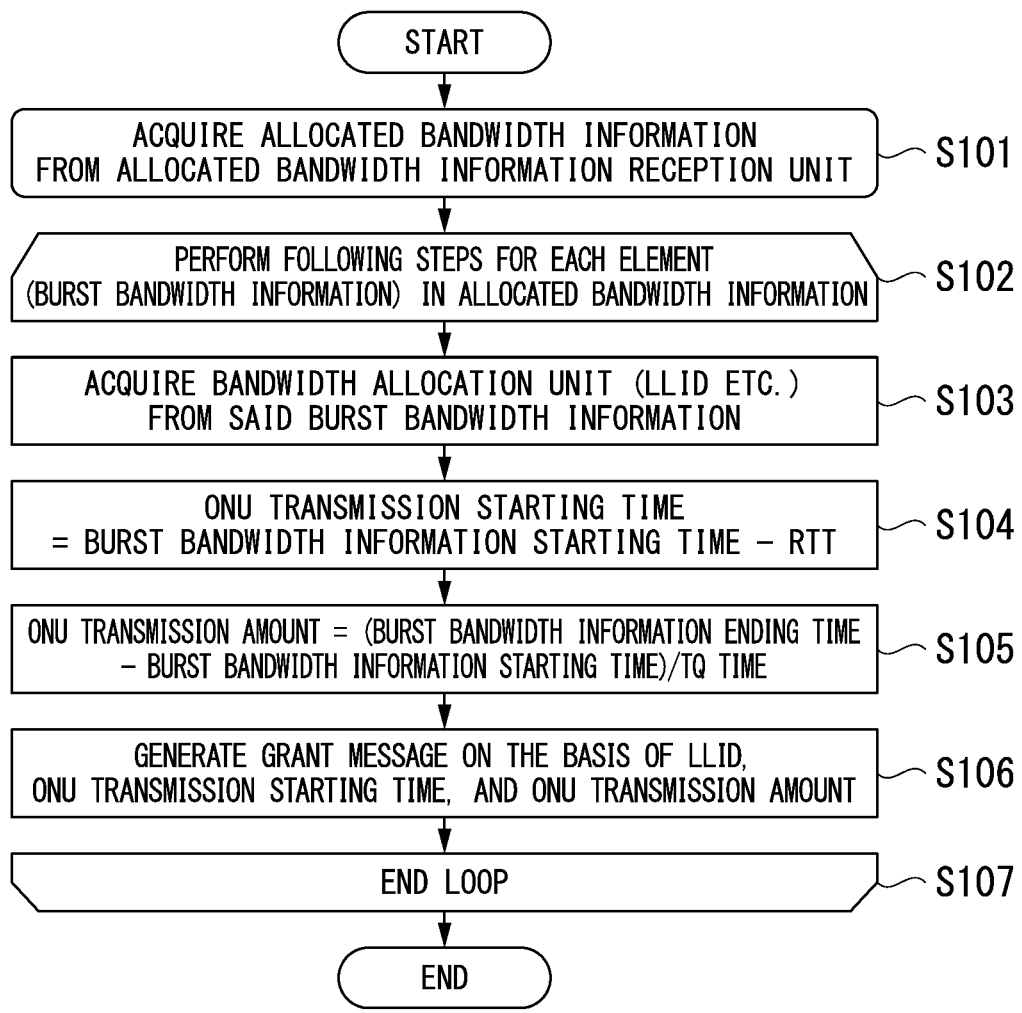
FIG. 8 is a flow chart illustrating an example of the operations in a GRANT-related information generation unit in an EPON.

FIG. 8 is a flow chart illustrating an example of the operations in a GRANT-related information generation unit 221 in an EPON. The GRANT-related information generation unit 221 in an EPON acquires allocated bandwidth information from the allocated bandwidth information reception unit 220 (step S101). The GRANT-related information generation unit 221 executes the process from step S103 to step S106 for each element (burst bandwidth information) included in the allocated bandwidth information (step S102).

The GRANT-related information generation unit 221 acquires a bandwidth allocation unit (an LLID etc.) from the burst bandwidth information included in the allocated bandwidth information (step S103). The GRANT-related information generation unit 221 computes the time at which an optical network unit started transmitting a signal (ONU transmission starting time) by subtracting the RTT of the optical network unit, which is indicated by an identifier of a transmission-source optical network unit included in the burst bandwidth information, from a reception starting time (burst bandwidth information starting time) included in the burst bandwidth information (step S104). The information representing the RTT is included in the communication scheme-dependent information.

The GRANT-related information generation unit 221 subtracts the burst bandwidth information starting time from a reception ending time (burst bandwidth information ending time) included in the burst bandwidth information. The GRANT-related information generation unit 221 computes the bandwidth amount (ONU transmission amount) of a signal transmitted from an optical network unit by converting the subtracted results into time in TQ units (step S105). The GRANT-related information generation unit 221 in an EPON generates a GRANT message on the basis of the LLID, the ONU transmission starting time, and the ONU transmission amount (step S106). The GRANT-related information generation unit 221 returns the process to step S102 (step S107).

In a GPON, the GRANT-related information generation unit 221 generates GRANT-related information that is to be transmitted to each optical network unit on the basis of a bandwidth allocation unit (an Alloc ID in a GPON) included in each burst bandwidth information, a transmission starting time at which the optical network unit is to start transmitting an upstream burst signal, and a transmission ending time at which the optical network unit is to stop transmitting the upstream burst signal. The transmission starting time and the transmission ending time, which are GRANT-related information, are represented by relative times based on equivalent delay processing. The transmission starting time and the transmission ending time can be computed on the basis of the allocated bandwidth information. The GRANT-related information generation unit 221 in a GPON generates a USBWMap for each time slot on the basis of the Alloc-ID, the transmission starting time, and the transmission ending time.

The GRANT-related information transmission control unit 222 acquires the GRANT-related information from the GRANT-related information generation unit 221. The GRANT-related information transmission control unit 222 controls the transmission time of the GRANT-related information.

The optical line terminal 1 transmits, to an optical network unit, a GRANT message permitting the transmission of a burst signal representing a REPORT message by the time (a transmission limit time to be described below) representing the result obtained by subtracting the RTT between the optical line terminal 1 and the optical network unit from a time t at which the optical line terminal 1 begins receiving the burst signal representing the REPORT message. The GRANT-related information transmission control unit 222 may compute the transmission time of the GRANT message by taking into consideration conditions regarding the reception times and transmission times of the GRANT message and the REPORT message. As long as the conditions regarding the transmission times of GRANT messages are satisfied, there are no constraints on the transmission order of the GRANT messages.

Figure 9:
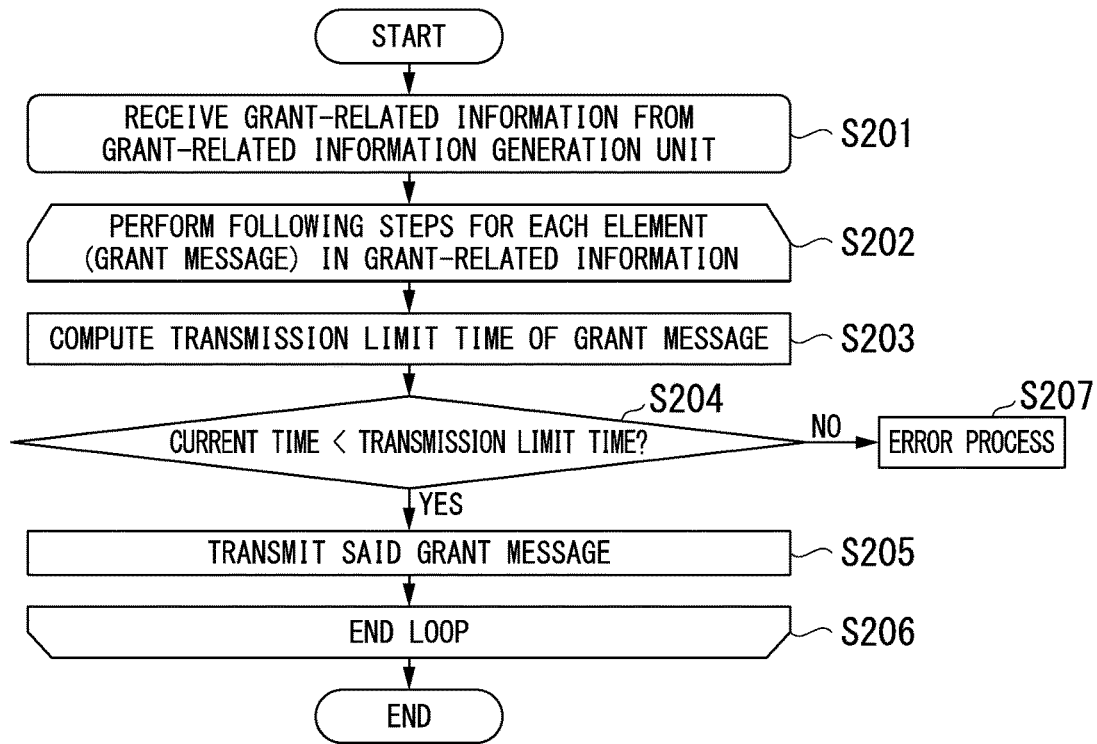
FIG. 9 is a flow chart illustrating an example of the operations in a GRANT-related information transmission control unit in an EPON.

FIG. 9 is a flow chart illustrating an example of the operations in a GRANT-related information transmission control unit 222 in an EPON. The GRANT-related information transmission control unit 222 in the EPON acquires the GRANT-related information from the GRANT-related information generation unit 221 (step S201). The GRANT-related information transmission control unit 222 executes the process from step S203 to step S205 for each element included in the GRANT-related information (step S202).

The GRANT-related information transmission control unit 222 computes a conditional time (transmission limit time) by which a GRANT message can be transmitted from the optical line terminal 1 (step S203). The GRANT-related information transmission control unit 222 determines whether or not the current time is before the transmission limit time. In other words, the GRANT-related information transmission control unit 222 determines whether or not a GRANT message can be transmitted (step S204).

If the current time is before the transmission limit time (step S204: YES), then the GRANT-related information transmission control unit 222 transmits the GRANT message to the optical network unit (step S205). The GRANT-related information transmission control unit 222 returns the process to step S202 (step S206). If the current time is at or later than the transmission limit time (step S204: NO), then the GRANT-related information transmission control unit 222 notifies the platform unit 3 by providing error information indicating that the GRANT message cannot be transmitted from the optical line terminal 1 (step S207).

In a GPON, the GRANT-related information generation unit 221 generates GRANT-related information (USBW-Map) that is transmitted to each optical network unit for each time slot. The GRANT-related information transmission control unit 222 transmits the generated GRANT-related information with the period (125 µs) of a time slot.

Figure 10:
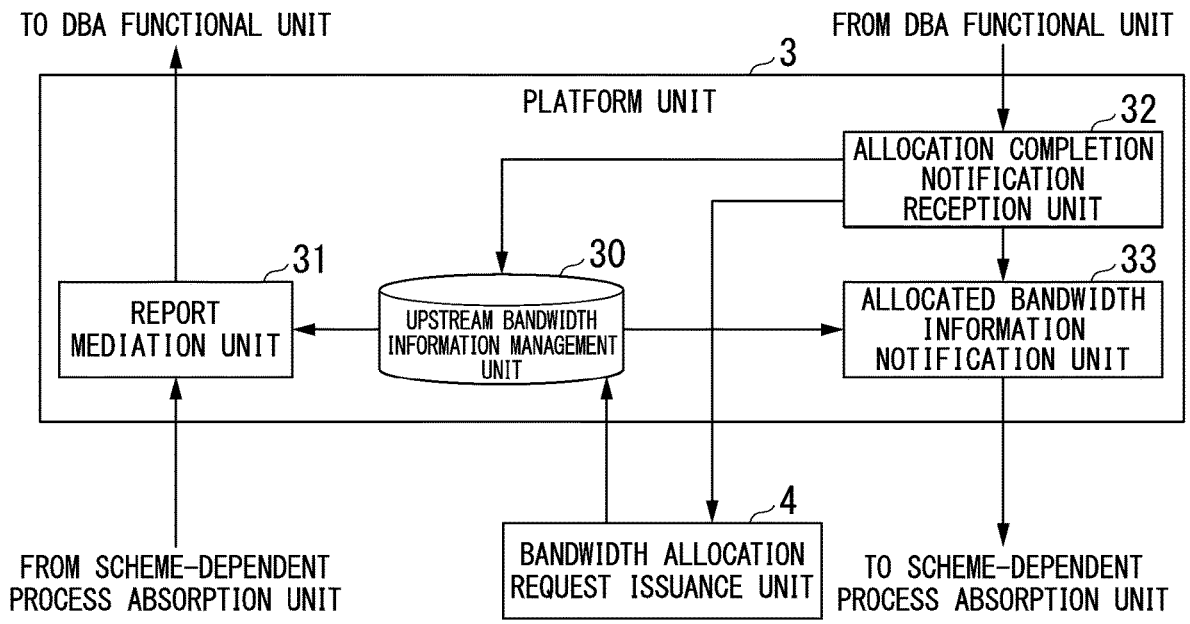
FIG. 10 is a diagram illustrating an example of the structure of a platform unit.

FIG. 10 is a diagram illustrating an example of the structure of the platform unit 3. The platform unit 3 is provided with an upstream bandwidth information management unit 30, a REPORT mediation unit 31, an allocation completion notification reception unit 32, and an allocated bandwidth information notification unit 33.

Figure 11:
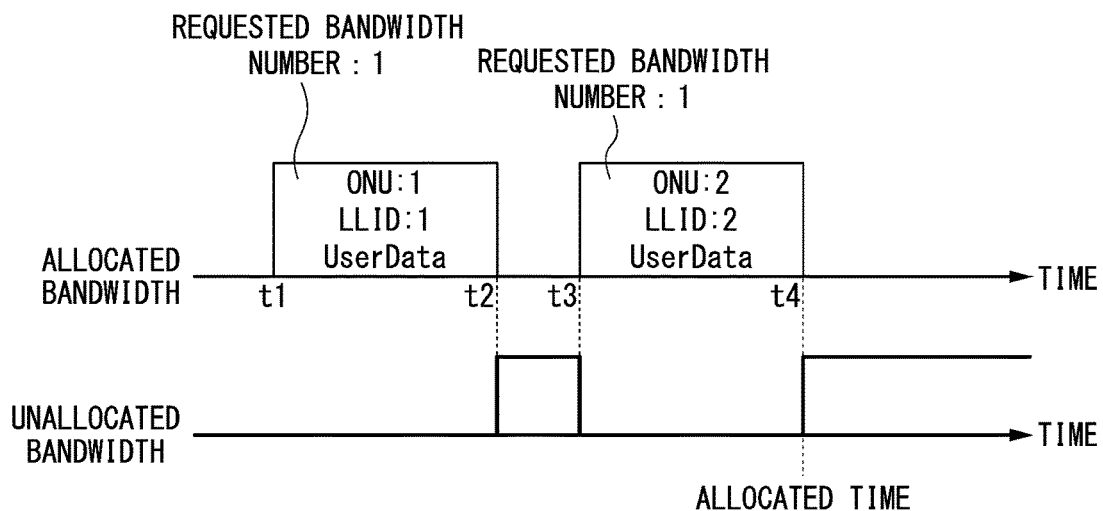
FIG. 11 is a time chart illustrating an example of upstream bandwidth information.

FIG. 11 is a time chart illustrating an example of upstream bandwidth information. Upstream bandwidth information is a set of burst bandwidth information including information representing the time at which an optical line terminal 1 is to start receiving an burst signal in the upstream direction (reception starting time), information representing the time at which the optical line terminal 1 is to stop receiving the burst signal in the upstream direction (reception ending time), an identifier of a transmission-source optical network unit, information representing a bandwidth allocation unit (an LLID, an Alloc-ID, or the like) of the transmission source, information representing the types of packets (user data, GRANT messages, or the like) included in the burst signal, and a requested bandwidth number. In FIG. 11, the upstream bandwidth information includes two sets of burst bandwidth information. The first burst bandwidth information includes, as the reception starting time, the reception ending time, the identifier of the transmission-source optical network unit, the information representing the bandwidth allocation unit of the transmission source, the information representing the types of packets, and the requested bandwidth number, respectively, t1, t2, 1, 1, User Data, and 1. The second burst bandwidth information includes, as the reception starting time, the reception ending time, the identifier of the transmission-source optical network unit, the information representing the bandwidth allocation unit of the transmission source, the information representing the types of packets, and the requested bandwidth number, respectively, t3, t4, 2, 2, User Data, and 1.

Hereinafter, sets of information representing bandwidth for which allocation has not been determined will be referred to as "unallocated bandwidth information". The unallocated bandwidth information can be computed on the basis of the allocated bandwidth information. In other words, the bandwidth that has not been allocated is the unallocated bandwidth.

The upstream bandwidth information management unit 30 stores allocated bandwidth information, unallocated bandwidth information, allocation-requested bandwidth information, allocated time information, allocation-requested time information, a current requested bandwidth number, and a registration-purpose requested bandwidth number. The units of the time information in the upstream bandwidth information stored by the upstream bandwidth information management unit 30 are units that are common to different communication schemes.

Figure 12:
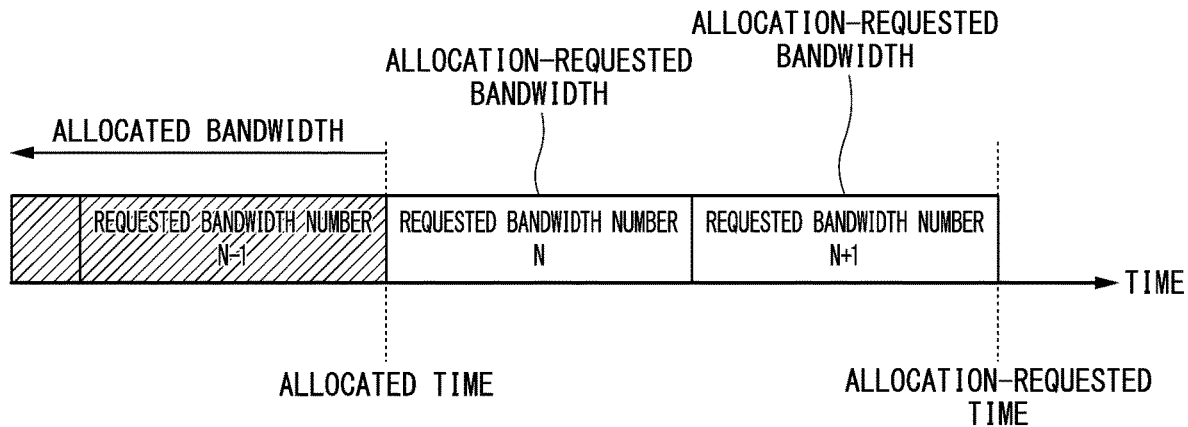
FIG. 12 is a diagram illustrating an example of allocated bandwidth and allocation-requested bandwidth.

FIG. 12 is a diagram illustrating examples of allocated bandwidth and allocation-requested bandwidth. Allocation-requested bandwidth is bandwidth that the bandwidth allocation request issuance unit 4 is requesting that the platform unit 3 allocate at the current time. The allocation-requested bandwidth information is a set including, as elements thereof, information relating to bandwidth (e.g., starting time information and ending time information) and requested bandwidth numbers, which are identifiers for identifying allocation-requested bandwidth.

The allocated time is the reception ending time of a signal of burst bandwidth allocated to the latest time period among the time periods indicated by the allocated bandwidth information. The allocation-requested time is the ending time of the allocation-requested bandwidth in the latest time period in the allocation-requested bandwidth included in the allocation-requested bandwidth information. The current requested bandwidth number is a number (requested bandwidth number) representing, within the allocation-requested bandwidth included in the allocation-requested bandwidth information, the bandwidth (currently requested bandwidth) that the platform unit 3 is requesting that the DBA functional unit 5 allocate at the current time. The registration-purpose requested bandwidth number is a requested bandwidth number that the platform unit 3 is to allocate to the allocation-requested bandwidth amount information when the platform unit 3 has acquired the allocation-requested bandwidth amount information from the bandwidth allocation request issuance unit 4. The allocation-requested bandwidth amount information T is information representing a time period in accordance with the allocation-requested bandwidth amount.

Figure 13:
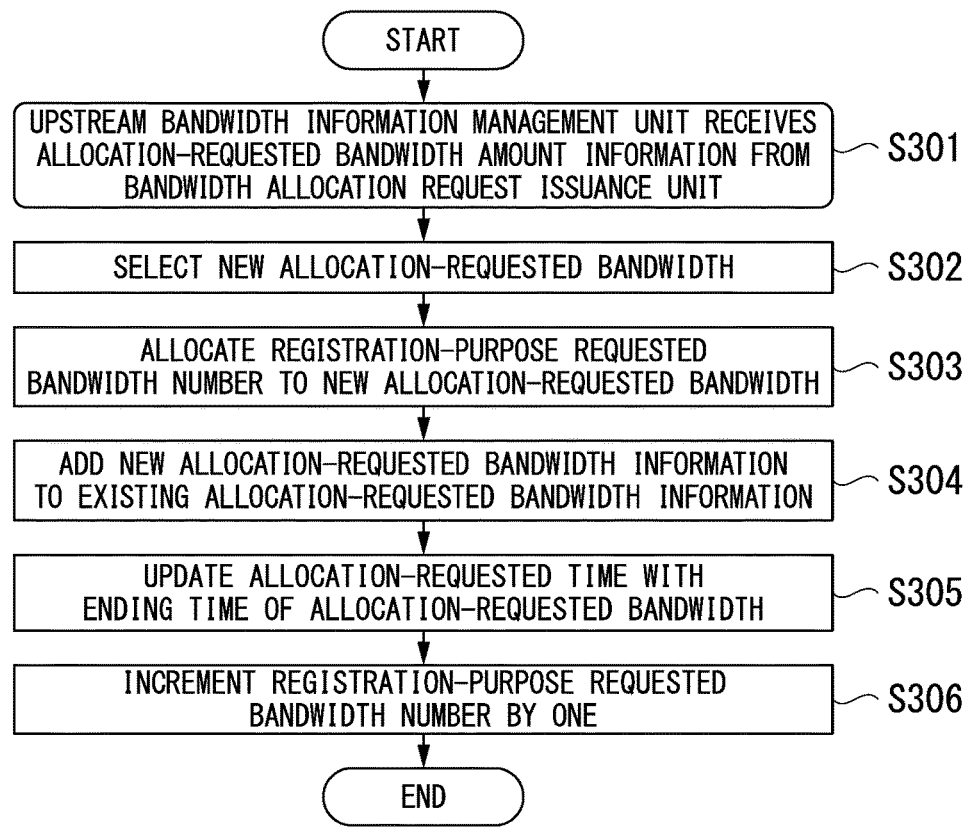
FIG. 13 is a flow chart illustrating an example of the operations in an upstream bandwidth information management unit.

FIG. 13 is a flow chart illustrating an example of the operations in the upstream bandwidth information management unit 30. The upstream bandwidth information management unit 30 updates the allocation-requested bandwidth information, the allocation-requested time information, and the registration-purpose requested bandwidth number on the basis of the allocation-requested bandwidth amount information T (steps S301 to S306). Specifically, the upstream bandwidth information management unit 30 acquires the allocation-requested bandwidth amount information T from the bandwidth allocation request issuance unit 4 (step S301). The upstream bandwidth information management unit 30 selects new allocation-requested bandwidth (step S302).

Figure 14:
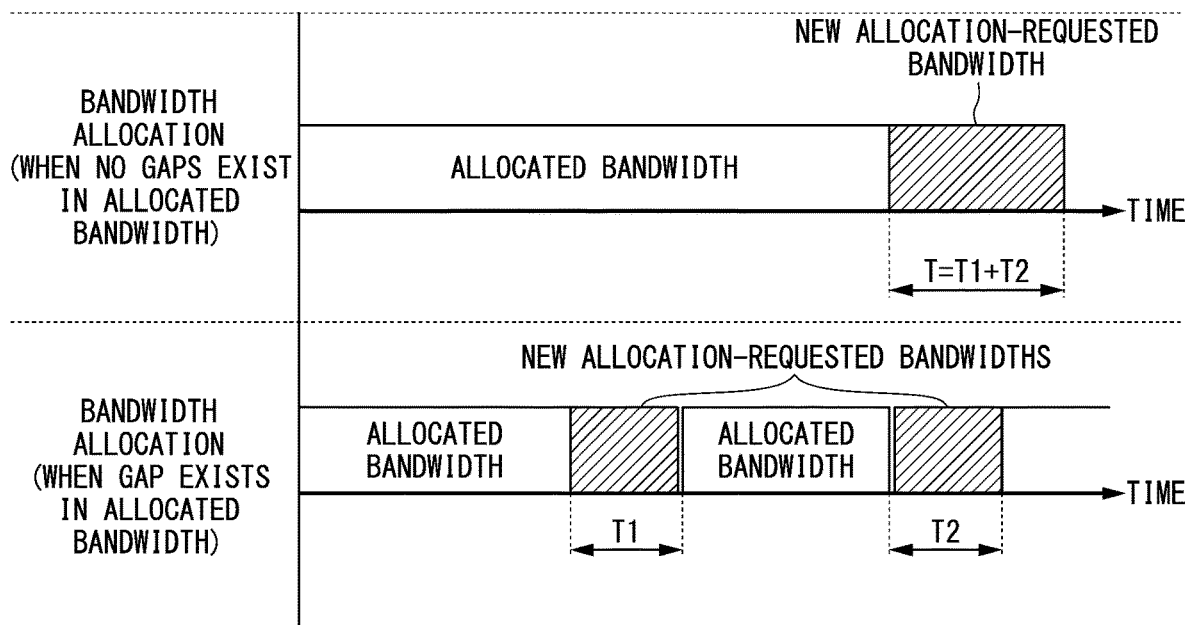
FIG. 14 is a diagram illustrating an example of a selection process for new allocation-requested bandwidth.

FIG. 14 is a diagram illustrating an example of a selection process for new allocation-requested bandwidth. If there are no gaps in the allocated bandwidth, then the upstream bandwidth information management unit 30 selects bandwidth from the allocated time t to a time "t+T" (bandwidth represented by "T=T1+T2") as new allocation-requested bandwidth. If there is a gap in the currently allocated bandwidth, then the upstream bandwidth information management unit 30 selects the new allocation-requested bandwidth (bandwidth represented by "T1" and "T2") so as to fill the gap.

Returning to FIG. 13, an example of the operations in the upstream bandwidth information management unit 30 will be described. The upstream bandwidth information management unit 30 allocates a registration-purpose requested bandwidth number to the new allocation-requested bandwidth that has been selected (step S303). The upstream bandwidth information management unit 30 adds the new allocation-requested bandwidth information to the existing allocation-requested bandwidth information (step S304). The upstream bandwidth information management unit 30 updates the allocation-requested time with the ending time of the allocation-requested bandwidth (step S305). The upstream bandwidth information management unit 30 increments the registration-purpose requested bandwidth number by one (step S306).

Hereinafter, a set including, as elements thereof, a bandwidth amount allocated to each burst signal and reception order information of burst signals for the optical line terminal 1 will be referred to as "bandwidth amount order information". Hereinafter, a set including, as elements thereof, information representing a reception starting time allocated to each burst signal and the bandwidth amount order information will be referred to as "allocated bandwidth amount order information".

Figure 15:
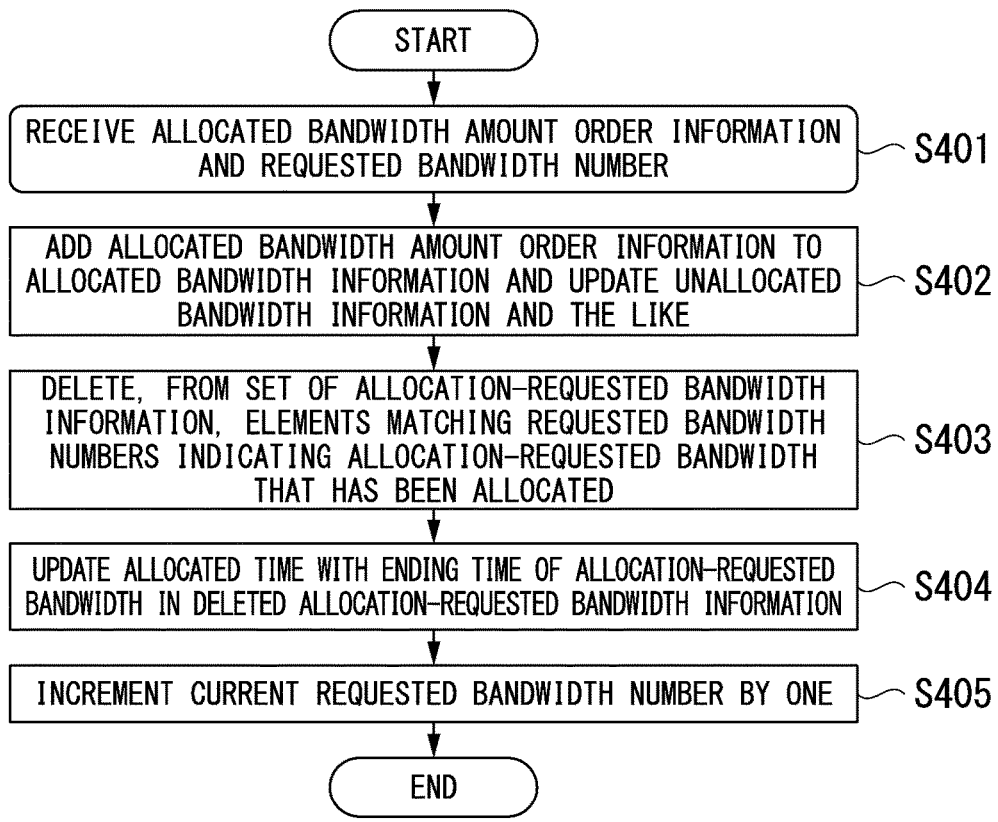
FIG. 15 is a flow chart illustrating an example of the operations in an upstream bandwidth information management unit.

FIG. 15 is a flow chart illustrating an example of the operations in the upstream bandwidth information management unit 30. The upstream bandwidth information management unit 30 acquires, from the allocation completion notification reception unit 32, the allocated bandwidth amount order information (scheduled bandwidth amount order information) and the requested bandwidth number indicating the allocation-requested bandwidth that has been allocated, and updates the allocated bandwidth information, the unallocated bandwidth information, the allocated time, the allocation-requested bandwidth information, and the current requested bandwidth number (steps S401 to S405). Specifically, the upstream bandwidth information management unit 30 acquires the allocated bandwidth amount order information (scheduled bandwidth amount order information) and the requested bandwidth number indicating the allocation-requested bandwidth number that has been allocated from the allocation completion notification reception unit 32 (step S401).

The upstream bandwidth information management unit 30 updates the allocated bandwidth information by adding the allocated bandwidth amount order information to the allocated bandwidth information, and updates the unallocated bandwidth information on the basis of the allocated bandwidth information that has been updated (step S402).

The upstream bandwidth information management unit 30 deletes, from the set of allocation-requested bandwidth information, elements (allocation-requested bandwidth information) that match requested bandwidth numbers indicating allocation-requested bandwidth that has been allocated (step S403). The upstream bandwidth information management unit 30 updates the allocated time with the ending time of the allocation-requested bandwidth of the deleted allocation-requested bandwidth information (step S404). The upstream bandwidth information management unit 30 increments the current requested bandwidth number by one (step S405).

Returning to FIG. 10, the description of the structure of the platform unit 3 will be continued. The REPORT mediation unit 31 acquires REPORT-extracted information from the REPORT message processing unit 20 in the scheme-dependent process absorption unit 2. The REPORT mediation unit 31 acquires unallocated bandwidth information from the upstream bandwidth information management unit 30.

The REPORT mediation unit 31 extracts bandwidth satisfying the allocation constraint conditions for each optical network unit from the bandwidth that has not been allocated by the current time (unallocated bandwidth) on the basis of the unallocated bandwidth information. The REPORT mediation unit 31 updates the REPORT-extracted information by including bandwidth satisfying the allocation constraint conditions in the REPORT-extracted information as new allocation constraint conditions.

The REPORT mediation unit 31 acquires the current requested bandwidth number and the current allocation-requested bandwidth information (hereinafter referred to as "current allocation-requested bandwidth information") from the upstream bandwidth information management unit 30. The REPORT mediation unit 31 outputs the updated REPORT-extracted information, the current requested bandwidth number, and the current allocation-requested bandwidth information to the DBA functional unit 5 as bandwidth allocation request information. As a result thereof, the DBA functional unit 5 is able to perform DBA on the basis of the bandwidth allocation request information.

The allocation completion notification reception unit 32 acquires, from the DBA functional unit 5, an allocation completion notification, the allocated bandwidth amount order information, and a requested bandwidth number indicating the allocation-requested bandwidth that has been allocated. The allocation completion notification reception unit 32 outputs, to the upstream bandwidth information management unit 30 and the bandwidth allocation request issuance unit 4, the allocation completion notification, the allocated bandwidth amount order information, and the requested bandwidth number indicating the allocation-requested bandwidth that has been allocated.

The allocated bandwidth information notification unit 33 detects updates to the allocated bandwidth information stored in the upstream bandwidth information management unit 30 by detecting recording operations and the like in the upstream bandwidth information management unit 30. The allocated bandwidth information notification unit 33 may detect these updates on the basis of allocation completion notifications that can be acquired from the allocation completion notification reception unit 32. The allocated bandwidth information notification unit 33 outputs the updated allocated bandwidth information to the allocated bandwidth information reception unit 220 in the GRANT message processing unit 22 in the scheme-dependent process absorption unit 2.

Figure 16:
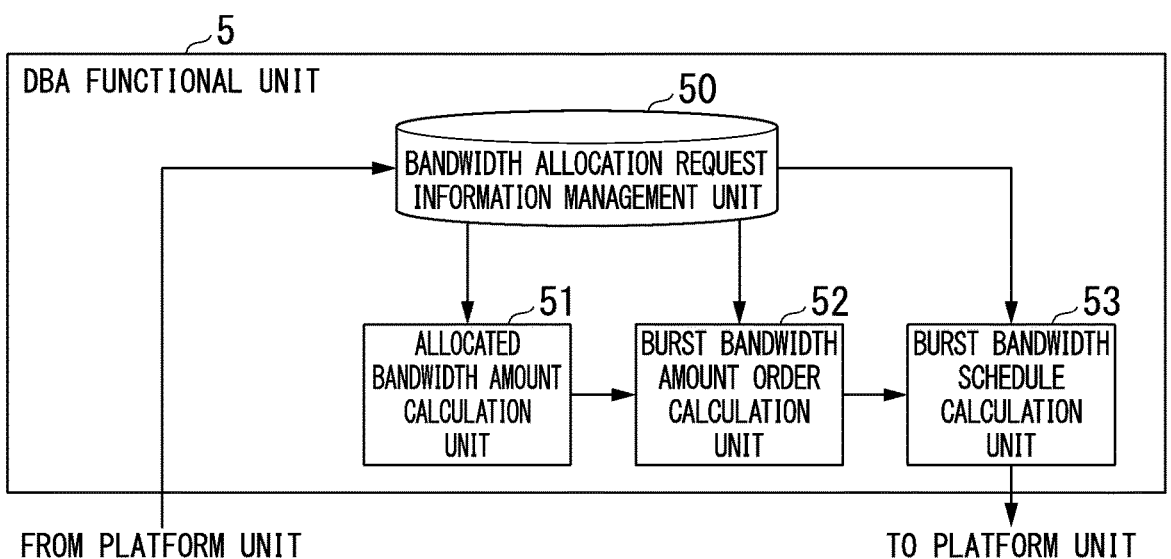
FIG. 16 is a diagram illustrating an example of the structure of a DBA functional unit.

FIG. 16 is a diagram illustrating an example of the structure of the DBA functional unit 5. The DBA functional unit 5 is provided with a bandwidth allocation request information management unit 50, an allocated bandwidth amount calculation unit 51, a burst bandwidth amount order calculation unit 52, and a burst bandwidth schedule calculation unit 53.

Figures 17, 18:
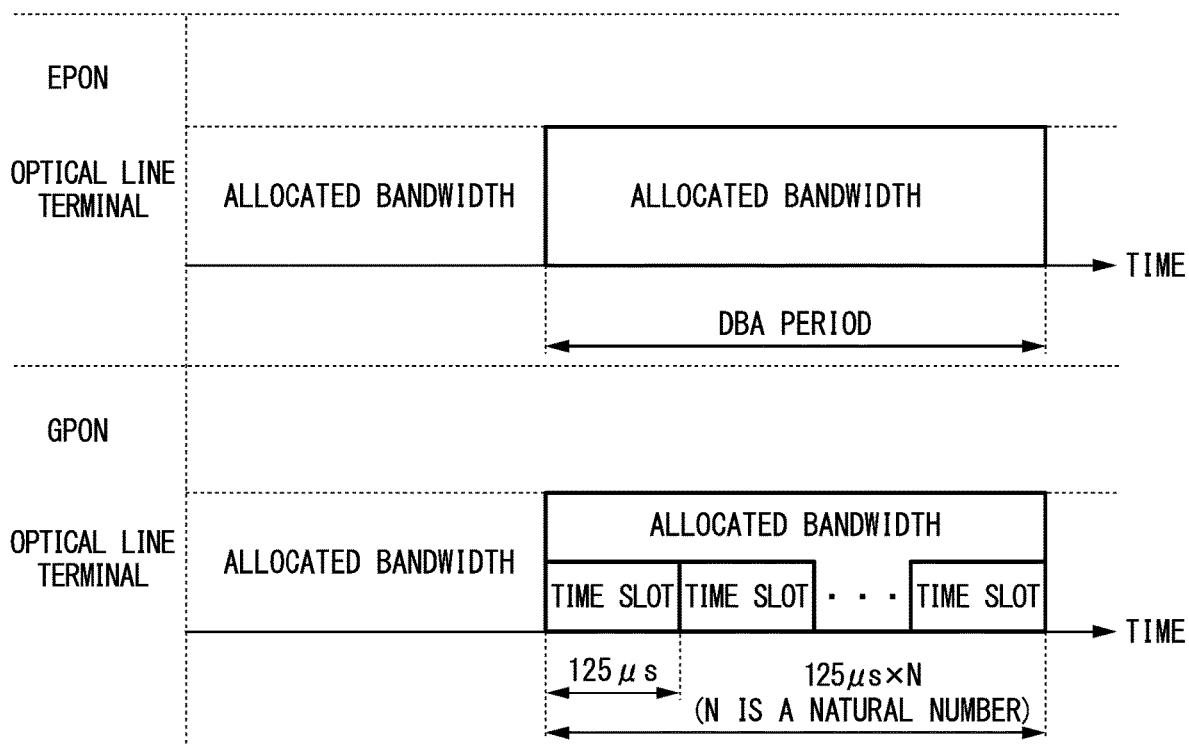
FIG. 17 is a diagram illustrating an example of some of the information stored by a bandwidth allocation request information management unit.
FIG. 18 is a time chart illustrating an example of the operations in a bandwidth allocation request issuance unit.

FIG. 17 is a diagram illustrating an example of a portion of the information stored in the bandwidth allocation request information management unit 50. The bandwidth allocation request information management unit 50 stores bandwidth allocation request information for each requested bandwidth number. The bandwidth allocation request information management unit 50 stores the current requested bandwidth number and the current allocation-requested bandwidth information that have been acquired.

The allocated bandwidth amount calculation unit 51 computes the bandwidth amount to be allocated for each bandwidth allocation unit on the basis of the current allocation-requested bandwidth information and the bandwidth allocation request information stored in the bandwidth allocation request information management unit 50. The allocated bandwidth amount calculation unit 51 may also compute the bandwidth amount to be allocated to user data for each optical network unit on the basis of the allocation constraint conditions and the demanded bandwidth amount information included in the bandwidth allocation request information. The allocated bandwidth amount calculation unit 51 may also compute the bandwidth amount on the basis of the method described in Non-Patent Document 1.

The timing at which the allocated bandwidth amount calculation unit 51 starts the process of computing the bandwidth amount to be allocated is not particularly restricted. For example, when the allocated bandwidth amount calculation unit 51 performs offline bandwidth allocation, the bandwidth allocation request information management unit 50 outputs notification information (in other words, information providing instructions to start the process of computing the bandwidth amount to be allocated) to the allocated bandwidth amount calculation unit 51 at a tuning at which the bandwidth allocation request information management unit 50 has stored bandwidth allocation request information of all of the optical network units connected to the optical line terminal 1. When the allocated bandwidth amount calculation unit 51 acquires the notification information, the computation process of the bandwidth amount to be allocated is started. For example, the allocated bandwidth amount calculation unit 51 may start the computation process of the bandwidth amount to be allocated when notification information is acquired from another functional unit. For example, the allocated bandwidth amount calculation unit 51 may start the computing process of the bandwidth amount to be allocated when notification information is acquired from an external system other than the optical line terminal 1.

When the computing process of the bandwidth amount to be allocated is completed, the allocated bandwidth amount calculation unit 51 outputs, to the burst bandwidth amount order calculation unit 52, a set (hereinafter referred to as the "allocated bandwidth amount information") including, as elements thereof, each bandwidth allocation unit and the bandwidth amount information allocated to the bandwidth allocation unit.

It should be noted that the DBA functional unit 5 may allocate not only bandwidth for signals for user data, but also bandwidth for signals for control including REPORT messages transmitted from optical network units.

Returning to FIG. 16, the description of the structure of the DBA functional unit 5 will be continued. The burst bandwidth amount order calculation unit 52 acquires, from the bandwidth allocation request information management unit 50, bandwidth allocation request information corresponding to the current requested bandwidth number. The burst bandwidth amount order calculation unit 52 acquires allocated bandwidth information from the allocated bandwidth amount calculation unit 51. The burst bandwidth amount order calculation unit 52 determines the allocation order of burst signals and the bandwidth amount of each burst signal on the basis of the bandwidth allocation request information corresponding to the current requested bandwidth number and the allocated bandwidth amount information. In other words, the burst bandwidth amount order calculation unit 52 determines the bandwidth amount order information.

The burst bandwidth amount order calculation unit 52 may divide the bandwidth amount allocated to each bandwidth allocation unit between multiple burst signals. Thereby, the burst bandwidth amount order calculation unit 52 can allocate multiple transmission rights to a single bandwidth allocation unit. The burst bandwidth amount order calculation unit 52 can perform more precise communication quality control.

The burst bandwidth amount order calculation unit 52 may determine the bandwidth amount order information on the basis of the allocation constraint conditions included in the bandwidth allocation request information corresponding to the current requested bandwidth number. The burst bandwidth amount order calculation unit 52 outputs the bandwidth amount order information to the burst bandwidth schedule calculation unit 53.

The burst bandwidth schedule calculation unit 53 acquires, from the bandwidth allocation request information management unit 50, the current allocation-requested bandwidth information and the bandwidth allocation request information corresponding to the current requested bandwidth number. The burst bandwidth schedule calculation unit 53 acquires bandwidth amount order information from the burst bandwidth amount order calculation unit 52. The burst bandwidth schedule calculation unit 53 determines the time (reception starting time) at which the optical line terminal 1 is to start receiving the burst signal in the upstream direction on the basis of the current allocation-requested bandwidth information and the bandwidth amount order information.

The burst bandwidth schedule calculation unit 53 determines the allocated bandwidth amount order information, in other words, the temporal arrangement of the bandwidth of the burst signals in the upstream direction, on the basis of the current allocation-requested bandwidth information and the bandwidth amount order information.

The order of the bandwidth of the burst signals in the upstream direction must be the order determined by the burst bandwidth amount order calculation unit 52. The temporal arrangement of the bandwidth of the burst signals in the upstream direction must satisfy the allocation constraint conditions included in the bandwidth allocation request information corresponding to the current requested bandwidth number acquired from the bandwidth allocation request information management unit 50. If the burst bandwidth schedule calculation unit 53 cannot schedule the bandwidth of the burst signals in the upstream direction so as to satisfy the order and the allocation constraint conditions, the burst bandwidth schedule calculation unit 53 notifies the allocated bandwidth amount calculation unit 51 and the burst bandwidth amount order calculation unit 52 that the bandwidth cannot be scheduled so as to satisfy the order and the allocation constraint conditions. The burst bandwidth schedule calculation unit 53, the allocated bandwidth amount calculation unit 51, and the burst bandwidth amount order calculation unit 52 re-execute the computation process of the bandwidth amount and the process of determining the order.

The burst bandwidth schedule calculation unit 53 outputs an allocation completion notification, the allocated bandwidth amount order information, and the current requested bandwidth number acquired from the bandwidth allocation request information management unit 50 to the allocation completion notification reception unit 32 in the platform unit 3.

Returning to FIG. 1, the description of the structure of the optical line terminal 1 will be continued. The bandwidth allocation request issuance unit 4 designates, to the platform unit 3, bandwidth that is requested to be allocated by the DBA functional unit 5. The bandwidth allocation request issuance unit 4 stores a parameter representing the bandwidth amount that is requested to be allocated at once by the DBA functional unit 5 (the "allocation-requested bandwidth amount" mentioned above). The allocation-requested bandwidth amount may be a value that fluctuates over time, or may be a fixed value.

FIG. 18 is a time chart illustrating an example of the operations in the bandwidth allocation request issuance unit 4. In offline bandwidth allocation in an EPON, the bandwidth allocation request issuance unit 4 defines, for example, a bandwidth amount for the DBA period as the allocation-requested bandwidth amount. In a GPON, the time slots of the signals in the upstream direction and the time slots of the signals in the downstream direction have a fixed value (=125 μs). For this reason, the bandwidth allocation request issuance unit 4 defines, for example, a bandwidth amount for a time period that is a natural-number multiple of 125 μs as the allocation-requested bandwidth amount. When an allocation completion notification is acquired from the allocation completion notification reception unit 32 in the platform unit 3, the bandwidth allocation request issuance unit 4 records information representing the allocation-requested bandwidth amount in the upstream bandwidth information management unit 30 in the platform unit 3.

As mentioned above, the optical line terminal 1 of the first embodiment is provided with a scheme-dependent process absorption unit 2 (absorption unit) and a DBA functional unit 5 (bandwidth allocation unit). The scheme-dependent process absorption unit 2 acquires first information of a type and a format that are dependent on the communication scheme. The first information is information in accordance with a message that an optical network unit is demanding permission to transmit an upstream signal, and for example, is information in accordance with a REPORT message. The scheme-dependent process absorption unit 2 converts the acquired first information into second information of a type and a format that are common to mutually different communication schemes. The second information is, for example, REPORT-extracted information. The scheme-dependent process absorption unit 2 determines the bandwidth allocation of an upstream signal allocated to the optical network unit on the basis of the second information. The optical line terminal 1 may be further provided with a platform unit 3 (mediation unit). The platform unit 3 may output the second information to the DBA functional unit 5. The platform unit 3 may output, to the scheme-dependent process absorption unit 2, information representing the bandwidth allocation (allocated bandwidth information) of upstream signals allocated to the optical network unit.

Thereby, the optical line terminal 1 in the first embodiment can suppress the complexification of the interface between the DBA functional unit 5 and other functional units in the optical line terminal 1 when communication schemes of PONs or the hardware structure of the optical line terminal 1 becomes diversified.

In other words, in the optical line terminal 1 in the first embodiment, information of a type and a format that are not dependent on the communication schemes of PONs or the hardware structure of the optical line terminal 1 is transmitted and received between the scheme-dependent process absorption unit 2 and the DBA functional unit 5. Even if communication schemes of PONs or the hardware structure of optical line terminal 1 becomes diversified, there is no need to change the interface between the scheme-dependent process absorption unit 2 and the DBA functional unit 5, and thus the scheme-dependent process absorption unit 2 is able to prevent an increase in the types of interfaces.

Modified Examples of First Embodiment

Offline bandwidth allocation has been described above. As a modified example of the first embodiment, online bandwidth allocation in an EPON will be described. Hereinafter, the difference between offline bandwidth allocation and online bandwidth allocation will be described.

Online bandwidth allocation refers to a scheme in which, during DBA, when the optical line terminal 1 receives a REPORT message from at least one optical network unit, the optical line terminal 1 transmits a GRANT message. Thereby, the optical line terminal 1 is able to allocate bandwidth to signals in accordance with traffic conditions, with little delay in comparison to offline bandwidth allocation.

The optical line terminal 1 does not need to be provided with the bandwidth allocation request issuance unit 4. The upstream bandwidth information management unit 30 does not need to store the allocation-requested bandwidth information, the allocation-requested time information, the current requested bandwidth number, and the registration-purpose requested bandwidth number. The bandwidth allocation request information does not need to include the current allocation-requested bandwidth information and the current requested bandwidth number.

The DBA functional unit 5 acquires, from the REPORT mediation unit 31, REPORT-extracted information including information representing allocation constraint conditions of bandwidth of at least one optical network unit connected to the optical line terminal 1. The DBA functional unit 5 starts the computation process of an allocated bandwidth amount on the basis of the acquired REPORT-extracted information.

Additionally, as described below, the REPORT message processing unit 20 in the scheme-dependent process absorption unit 2 may control the timing at which the bandwidth allocation request issuance unit 4 records information representing the allocation-requested bandwidth amount in the upstream bandwidth information management unit 30 during the process of requesting allocation of bandwidth. Thereby, the optical line terminal 1 is able to perform various types of DBA (e.g., double-phase DBA or the like in an EPON) other than offline bandwidth allocation.

In the double-phase DBA, multiple optical network units are divided into two groups (group A and group B). The DBA functional unit 5 can suppress delays in the burst signals in the upstream direction by performing DBA independently in each group.

The REPORT message processing unit 20 in the scheme-dependent process absorption unit 2 acquires REPORT-related information from optical network units belonging to the different groups. The REPORT message processing unit 20 notifies the bandwidth allocation request issuance unit 4 that the REPORT-related information has been acquired. The REPORT message processing unit 20 instructs the bandwidth allocation request issuance unit 4 to record information representing a new allocation-requested bandwidth amount in the upstream bandwidth information management unit 30 in the platform unit 3.

Figure 19:
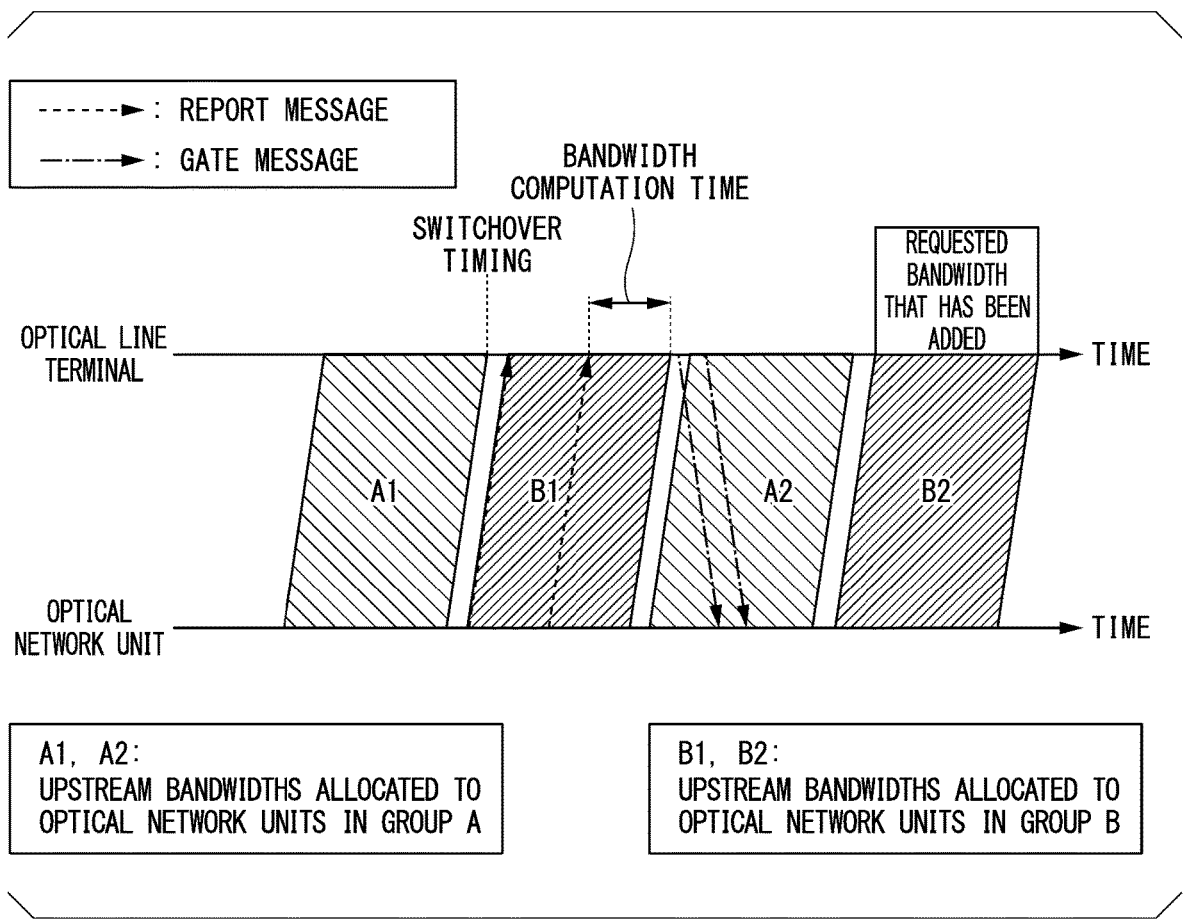
FIG. 19 is a time chart illustrating an example of "double-phase DBA".

FIG. 19 is a time chart illustrating an example of the "double-phase DBA". At the ending time "switchover timing" of the bandwidth "A1" illustrated in FIG. 19, the REPORT messages received by the optical line terminal 1 are switched from REPORT messages from the optical network units in group A to REPORT messages from the optical network units in group B. Thereby, when the transmission sources of the REPORT message are switched, a request to allocate bandwidth to a burst signal is added. The optical line terminal 1 allocates the bandwidth "B2" to the region (requested bandwidth) in which addition was requested on the basis of REPORT messages transmitted from the optical network units in group B to the optical line terminal 1 within the duration of the bandwidth in the upstream direction "B1".

Second Embodiment

The second embodiment differs from the first embodiment in that the scheme-dependent process absorption unit 2 is provided with at least the burst bandwidth schedule calculation unit 53 and the bandwidth allocation request issuance unit 4 among the burst bandwidth amount order calculation unit 52, the burst bandwidth schedule calculation unit 53, and the bandwidth allocation request issuance unit 4. For the second embodiment, the differences from the first embodiment will be described.

In the second embodiment, the scheme-dependent process absorption unit 2 is provided with a burst bandwidth amount order calculation unit 52, a burst bandwidth schedule calculation unit 53, and a bandwidth allocation request issuance unit 4. When the burst bandwidth amount order calculation unit 52 does not divide the bandwidth amount allocated to each bandwidth allocation unit between multiple burst signals, the DBA functional unit 5 may be provided with a burst bandwidth amount order calculation unit 52, as in the first embodiment. The bandwidth amount and the guard time necessary for transmitting the control signal in the upstream direction (hereinafter referred to as the "upstream control signal") can be computed on the basis of the number of optical network units connected to the PON.

The bandwidth allocation request issuance unit 4 performs processes that are dependent on the communication scheme. The bandwidth allocation request issuance unit 4 subtracts a time period in accordance with the bandwidth amount necessary to transmit the upstream control signal, which depends on the communication scheme, from a DBA period or the duration of a time slot. The bandwidth allocation request issuance unit 4 may subtract the duration of the guard time, which depends on the communication scheme, from a DBA period or the duration of a time slot. The bandwidth allocation request issuance unit 4 records, in the upstream bandwidth information management unit 30 in the platform unit 3, allocation-requested bandwidth information representing the allocation-requested bandwidth amount in accordance with the subtraction results.

The burst bandwidth amount order calculation unit 52 acquires allocated bandwidth amount information generated by the allocated bandwidth amount calculation unit 51 in the DBA functional unit 5, and a current requested bandwidth number stored in the bandwidth allocation request information management unit 50 in the DBA functional unit 5. The burst bandwidth amount order calculation unit 52 acquires the allocation-requested bandwidth information from the upstream bandwidth information management unit 30 in the platform unit 3.

The burst bandwidth amount order calculation unit 52 determines bandwidth amount order information representing a transmission order of burst signals including the upstream control signal. The burst bandwidth schedule calculation unit 53 determines the allocated bandwidth amount order information, in other words, the temporal arrangement of the bandwidth of the burst signals in the upstream direction, on the basis of the allocation-requested bandwidth information and the bandwidth amount order information.

The burst bandwidth schedule calculation unit 53 outputs, to the allocation completion notification reception unit 32 in the platform unit 3, an allocation completion notification, the allocated bandwidth amount order information, and a current requested bandwidth number acquired from the bandwidth allocation request information management unit 50.

The DBA functional unit 5 computes the bandwidth amount to be allocated to signals such as user data. The DBA functional unit 5 outputs information representing the bandwidth amount to the platform unit 3. The subsequent operations in the optical line terminal 1 are similar to the operations in the optical line terminal 1 in the first embodiment.

As described above, the scheme-dependent process absorption unit 2 in the second embodiment allocates bandwidth to the upstream signals on the basis of the allocated bandwidth amount information determined by the DBA functional unit 5. Thereby, the optical line terminal 1 in the second embodiment can suppress the complexification of the interface between the DBA functional unit 5 and other functional units in the optical line terminal 1 when communication schemes of PONs or the hardware structure of optical line terminal 1 becomes diversified.

The DBA functional unit 5 in the second embodiment can reduce the dependence of the DBA functional unit 5 on the communication scheme in comparison to that in the first embodiment. Additionally, the DBA functional unit 5 in the second embodiment can raise the commonality of the hardware structure of the DBA functional unit 5 in comparison to that in the first embodiment.

Third Embodiment

The third embodiment differs from the first embodiment and the second embodiment in that the optical line terminal 1 is provided with multiple DBA functional units 5. For the third embodiment, the differences from the first embodiment and the second embodiment will be described.

In the third embodiment, multiple DBA functional units 5 allocate bandwidth to signals using DBA algorithms that are different for each bandwidth. The DBA functional units 5 are allocated identifiers (DBA-IDs).

When recording information representing a new allocation-requested bandwidth amount in an upstream bandwidth information management unit 30 in a platform unit 3, the bandwidth allocation request issuance unit 4 records, in current allocation-requested bandwidth information that is stored in the upstream bandwidth information management unit 30, the DBA-ID of the DBA functional unit 5 that is the destination of the request for allocation of the bandwidth.

A REPORT mediation unit 31 determines the DBA functional unit 5 that is the output destination of information representing a new allocation-requested bandwidth amount on the basis of the DBA-ID included in the current allocation-requested bandwidth information acquired from the upstream bandwidth information management unit 30. The REPORT mediation unit 31 outputs information representing the new allocation-requested bandwidth amount to the determined DBA functional unit 5.

As described above, the DBA functional units 5 in the third embodiment allocate bandwidth to upstream signals using DBA algorithms that are different for each bandwidth. Thereby, the optical line terminal 1 in the third embodiment can suppress the complexification of the interfaces between the DBA functional units 5 and other functional units in the optical line terminal 1 when communication schemes of PONs or the hardware structure of optical line terminal 1 becomes diversified. The optical line terminal 1 in the third embodiment can perform flexible bandwidth control.

Although embodiments of the present invention have been described in detail above with reference to the drawings, the specific structures are not limited to those in these embodiments and designs or the like within a scope not departing from the gist of the present invention are included.

The optical line terminals and the optical network units in the aforementioned embodiments may be realized in a computer. In that case, it is possible to realize these apparatuses by recording programs for realizing the functions of these apparatuses in computer-readable recording media, and having a computer system read and run the programs recorded on these recording media. It should be noted that the "computer system" mentioned here includes operating systems (OSs) and hardware such as peripheral devices. Additionally, "computer-readable recording media" refers to portable media such as flexible disks, magneto-optical discs, read-only memories (ROMs), and compact disc (CD)-ROMs, and also to storage apparatuses, such as hard disks, installed internally in a computer system. Furthermore, the "computer-readable recording media" may include those that dynamically hold the programs for a short time, such as communication cables when the programs are transmitted over a network such as the internet or over a communication line such as a telephone line, and in this case, they may include those that hold the programs for a certain period of time, such as volatile memories inside a computer system used as a server or a client. Additionally, these programs may be those for realizing some of the aforementioned functions, and furthermore, the aforementioned functions may be able to be realized by being combined with programs that are already recorded in a computer system, or may be realized by using programmable logic devices such as field-programmable gate arrays (FPGAs).

INDUSTRIAL APPLICABILITY

The present invention can be applied, for example, to passive optical networks. The present invention is able to suppress the complexification of the interfaces between DBA functional units and other functional units in optical line terminals even when communication schemes of PONs or the hardware structures of the optical line terminals become diversified.

DESCRIPTION OF REFERENCE SIGNS

1 Optical line terminal
2 Scheme-dependent process absorption unit
3 Platform unit
4 Bandwidth allocation request issuance unit
5 DBA functional unit
20 REPORT message processing unit
21 Communication scheme-dependent information management unit
22 GRANT message processing unit
30 Upstream bandwidth information management unit
31 REPORT mediation unit
32 Allocation completion notification reception unit
33 Allocated bandwidth information notification unit
50 Bandwidth allocation request information management unit
51 Allocated bandwidth amount calculation unit
52 Burst bandwidth amount order calculation unit
53 Burst bandwidth schedule calculation unit
200 REPORT-related information reception unit
201 Communication scheme-dependent information extraction unit
202 REPORT-extracted information generation unit
220 Allocated bandwidth information reception unit
221 GRANT-related information generation unit
222 GRANT-related information transmission control unit

The invention claimed is:
1. An optical line terminal comprising:
a processor; and
a storage medium having computer program instructions stored thereon, wherein the computer program instructions, when executed by the processor, perform to
acquire first information of a type and a format that are dependent on a communication scheme,
convert the acquired first information into second information of a type and a format that are common to mutually different communication schemes, and
determine bandwidth allocation of an upstream signal allocated to an optical network unit on the basis of the second information,
wherein the first information is information in accordance with a message by which the optical network unit demands permission to transmit the upstream signal.
2. The optical line terminal according to claim 1, wherein the computer program instructions further perform to output the second information for use in determining the bandwidth allocation and output information representing the bandwidth allocation of the upstream signal allocated to the optical network unit for use in converting the first information into the second information.
3. The optical line terminal according to claim 1, wherein the computer program instructions further perform to allo- cate bandwidth to the upstream signal on the basis of a determined bandwidth amount.

4. The optical line terminal according to claim 1, wherein the computer program instructions further perform to allocate bandwidth to the upstream signal by using an allocation algorithm that differs for each bandwidth.

5. A bandwidth allocation method performed by an optical line terminal, the bandwidth allocation method comprising:
　acquiring first information of a type and a format that are dependent on a communication scheme;
　converting the acquired first information into second information of a type and a format that are common to mutually different communication schemes; and
　determining bandwidth allocation of an upstream signal allocated to an optical network unit on the basis of the second information,
　wherein the first information is information in accordance with a message by which the optical network unit demands permission to transmit the upstream signal.

* * * * *